United States Patent
Furuta et al.

(10) Patent No.: US 8,536,486 B2
(45) Date of Patent: Sep. 17, 2013

(54) METHOD OF DIVIDING WORKPIECE USING LASER BEAM

(75) Inventors: Kenji Furuta, Ota-ku (JP); Satoshi Usuda, Ota-ku (JP)

(73) Assignee: Disco Corporation, Tokyo (JP)

( * ) Notice: Subject to any disclaimer, the term of this patent is extended or adjusted under 35 U.S.C. 154(b) by 176 days.

(21) Appl. No.: 13/113,379

(22) Filed: May 23, 2011

(65) Prior Publication Data

US 2011/0290769 A1 Dec. 1, 2011

(30) Foreign Application Priority Data

Jun. 1, 2010 (JP) .................................. 2010-125503

(51) Int. Cl.
 *B23K 26/00* (2006.01)
(52) U.S. Cl.
 USPC ............... 219/121.72; 219/121.71; 219/121.6
(58) Field of Classification Search
 USPC .............................. 219/121.6, 121.61, 121.72
 See application file for complete search history.

(56) References Cited

U.S. PATENT DOCUMENTS

| 6,359,252 B1 * | 3/2002 | Sanjeu et al. ............ 219/121.64 |
| 2005/0236381 A1 * | 10/2005 | Nomaru .................... 219/121.74 |
| 2010/0044359 A1 * | 2/2010 | Sawabe .................... 219/121.83 |
| 2010/0133243 A1 * | 6/2010 | Nomaru et al. .......... 219/121.67 |

FOREIGN PATENT DOCUMENTS

| JP | 08285524 A | * 11/1996 |
| JP | 2002-192370 | 7/2002 |
| JP | 2010-046703 | 3/2010 |

* cited by examiner

*Primary Examiner* — Henry Yuen
*Assistant Examiner* — Ayub Maye
(74) *Attorney, Agent, or Firm* — Greer, Burns & Crain, Ltd

(57) ABSTRACT

A workpiece including an irregularly shaped portion on a dividing line is divided along the dividing line by detecting the location of the irregularly shaped portion, applying a detecting laser beam to an area of the workpiece except for the detected location, along the dividing line to detect the height of a surface of the workpiece except for the location, applying and focusing a machining laser beam having a wavelength which permeates the workpiece within the workpiece while moving a focused spot of the machining laser beam based on the detected height of the surface of the workpiece to form a modified layer in an area of the workpiece except for at least the location of the irregularly shaped portion along the dividing line, and applying an external force to the modified layer to divide the workpiece along the dividing line.

5 Claims, 4 Drawing Sheets

METHOD OF DIVIDING WORKPIECE USING LASER BEAM

BACKGROUND OF THE INVENTION

1. Field of the Invention

The present invention relates to a workpiece dividing method using a laser beam, and more particularly to a method of dividing a workpiece such as a semiconductor wafer or a light-emitting device wafer with a laser beam.

2. Description of the Related Art

There is known a method of dividing a workpiece such as a semiconductor wafer or a light-emitting device wafer along streets (dividing lines) with a laser beam (see, for example, Japanese Patent No. 3408805). According to the dividing method using the laser beam, a pulsed laser beam is applied to a wafer while being focused on a point within the wafer, continuously forming a modified layer within the wafer along streets. As the wafer has its mechanical strength lowered at the modified layer, the wafer can be divided along the streets when subjected to external forces.

Plate-like workpieces such as wafers or the like are liable to suffer thickness variations due to warpage, undulation, etc. When such a workpiece is to be divided by a laser beam, a uniform modified layer may not be formed in the workpiece at a prescribed depth on account of thickness variations thereof. As a solution to the problem, there is known a laser machining apparatus for detecting surface displacements (surface irregularities) on streets of a workpiece and controlling the focused spot of a laser beam to follow the detected surface displacements (see, for example, Japanese Patent Laid-Open No. 2010-046703).

According to Japanese Patent Laid-Open No. 2010-046703, the laser machining apparatus applies a detecting laser beam to the surface of a workpiece that is held by a holding table, and measures changes in the light intensity of a laser beam reflected from the surface of the workpiece to determine surface displacements of the workpiece. Based on the detected surface displacements of the workpiece, the laser machining apparatus focuses a machining laser beam while adjusting the focus thereof to form a modified layer in the workpiece at a prescribed depth from the surface of the workpiece.

SUMMARY OF THE INVENTION

If the laser machining apparatus disclosed in Japanese Patent Laid-Open No. 2010-046703 is to machine a workpiece which includes an irregularly shaped portion having an extreme height difference, then it is time-consuming to adjust the focused spot of a laser beam against the speed at which the workpiece is fed, making it difficult to form a modified layer at a prescribed depth from the surface of the workpiece. The modified layer tends to be formed in a widely displaced position particularly in the vicinity of the irregularly shaped portion.

It is an object of the present invention to provide a method of dividing a workpiece which includes an irregularly shaped portion having an extreme height difference, by forming a modified layer at a prescribed depth from the surface of the workpiece with a laser beam.

In accordance with an aspect of the present invention, there is provided a method of dividing a workpiece along a dividing line, the workpiece including an irregularly shaped portion on the dividing line, including the irregularly shaped portion detecting step of detecting the location of the irregularly shaped portion, the surface height detecting step of applying a detecting laser beam to an area of the workpiece except for the location which is detected in the irregularly shaped portion detecting step, along the dividing line to detect the height of a surface of the workpiece except for the location, the modified layer forming step of applying and focusing a machining laser beam having a wavelength which permeates the workpiece within the workpiece while moving a focused spot of the machining laser beam based on the height of the surface of the workpiece which is detected in the surface height detecting step to form a modified layer in an area of the workpiece except for at least the location of the irregularly shaped portion along the dividing line, and the dividing step of applying an external force to the modified layer to divide the workpiece along the dividing line.

According to the above method, the height of the surface of the workpiece along the dividing line except for the location of the irregularly shaped portion is detected, and the machining laser beam is focused in the workpiece while the focused spot of the machining laser beam is being moved based on the detected height of the surface of the workpiece. Consequently, the position where the modified layer is not adversely affected by an extreme height difference at the irregularly shaped portion. The modified layer can thus be formed at an appropriate depth in the workpiece with the irregularly shaped portion. When the workpiece is divided along the dividing line, individual chips of high quality can be produced from the workpiece.

Preferably, the irregularly shaped portion detecting step includes the steps of applying the detecting laser beam along the dividing line including the location of the irregularly shaped portion, and detecting the location of the irregularly shaped portion based on the intensity of a laser beam which is reflected from the workpiece at the time the detecting laser beam is applied to the workpiece.

According to the present invention, therefore, a modified layer can be formed by laser beam machining at an appropriate depth in a workpiece which includes an irregularly shaped portion having an extreme height difference.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

There has been proposed by the assignee of the present application a laser machining apparatus which detects the height of the surface of a workpiece and thereafter applies a laser beam to the workpiece while moving the focused spot of the laser beam based on the detected height of the surface of the workpiece, thereby forming a modified layer in the workpiece at an appropriate depth from the surface of the workpiece. When the laser machining apparatus detects the height of the surface of a semiconductor wafer, it controls a condenser lens to follow the intensity of a laser beam reflected from the semiconductor wafer as a result of the application of a detecting laser beam to the semiconductor wafer. Since the condenser lens is controlled to follow the intensity of the reflected laser beam, the range in which the optical path of the reflected laser beam fluctuates is reduced, for thereby guiding the reflected laser beam properly to a light-detecting device, so that a wider measurement range is provided than if the intensity of the reflected laser beam were measured by the light-detecting device alone.

The laser machining apparatus detects the height of the surface of the semiconductor wafer based on the height of the condenser lens and the intensity of the reflected laser beam which is measured by the light-detecting device. Therefore, the laser machining apparatus is arranged to detect the height of the surface of the semiconductor wafer by controlling the condenser lens to follow the intensity of the reflected laser beam. In the process of fabricating semiconductor devices, semiconductor wafers may possibly develop an irregularly shaped portion, such as a hole on a dividing line, having a height difference which is larger than the range in which a condenser lens is actuatable. The hole makes it difficult for the laser machining apparatus to appropriately detect the height of the surface of the semiconductor wafer in the vicinity of the hole.

Figure 4A:
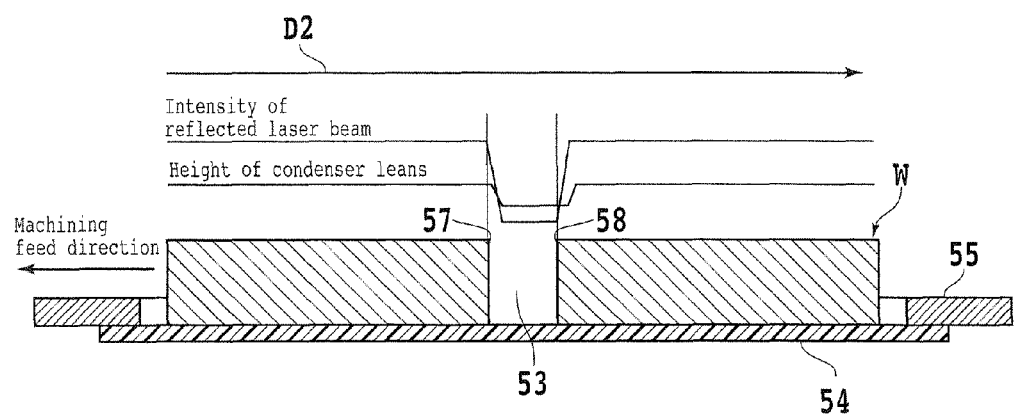
FIGS. 4A and 4B are schematic views showing the relationship between the intensity of a reflected laser beam and the height of a condenser lens of a conventional laser machining apparatus.
Figure 4B:
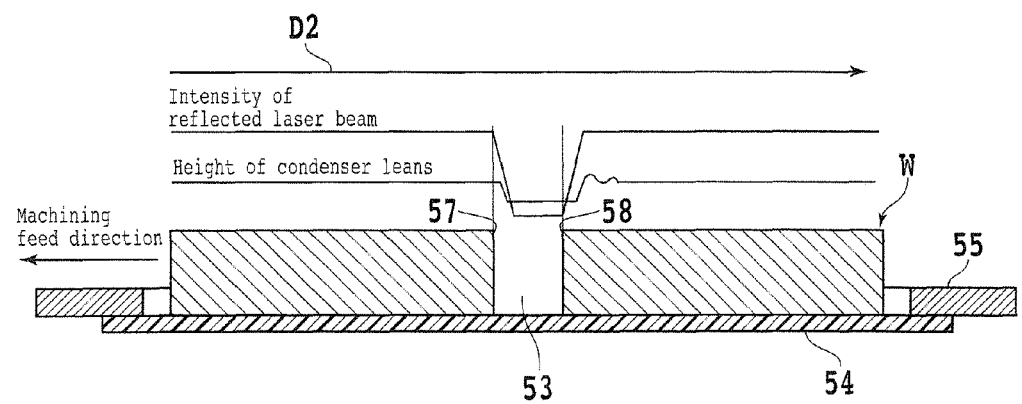

FIG. 4A shows the relationship between the intensity of a reflected laser beam and the height of a condenser lens of a conventional laser machining apparatus. As shown in FIG. 4A, the condenser lens fails to exactly follow the intensity of the reflected laser beam near a hole 53 in a semiconductor wafer W. Specifically, when a detecting laser beam applied to the semiconductor wafer W scans the semiconductor wafer W in the direction indicated by the arrow D2, the height of the condenser lens exactly follows the intensity of the reflected laser beam up to a leading edge 57 of the hole 53. When the applied position of the detecting laser beam moves across the leading edge 57 of the hole 53, the intensity of the reflected laser beam abruptly drops. At the time the intensity of the reflected laser beam becomes lower than a certain threshold value, the condenser lens becomes unable to follow the intensity of the reflected laser beam, and is fixed to a certain height. When the applied position of the detecting laser beam moves across a trailing edge 58 of the hole 53, the intensity of the reflected laser beam abruptly rises. At the time the intensity of the reflected laser beam becomes higher than the certain threshold value, the condenser lens starts to follow the intensity of the reflected laser beam. As the condenser lens lags in its action to follow the intensity of the reflected laser beam, the detected height of the surface of the semiconductor wafer W suffers an error commensurate with the lag in the following action of the condenser lens. In addition, as shown in FIG. 4B, when the applied position of the detecting laser beam moves across the trailing edge 58 of the hole 53, the process of adjusting the height of the condenser lens may fail to deal with the abrupt change in the intensity of the reflected laser beam, but may suffer an overshoot. In this case, the detected height of the surface of the semiconductor wafer W suffers an error until the process of adjusting the height of the condenser lens becomes stable.

The assignee of the present application has thus found out that when the height of the surface of the semiconductor wafer W is detected by controlling the condenser lens to follow the intensity of the reflected laser beam, the detected height is liable to undergo an error at the trailing edge 58 where the applied position of the detecting laser beam leaves the hole 53. Furthermore, the assigner has also found out that it is possible to appropriately measure the height of the surface of the semiconductor wafer W by stopping the condenser lens from following the intensity of the reflected laser beam in a certain zone which includes an irregularly shaped portion having an extreme height difference, such as the hole 53. Accordingly, it is possible to form a modified layer at a suitable height in a workpiece by appropriately measuring the height of the surface of the workpiece which includes an irregularly shaped portion.

Figure 1:
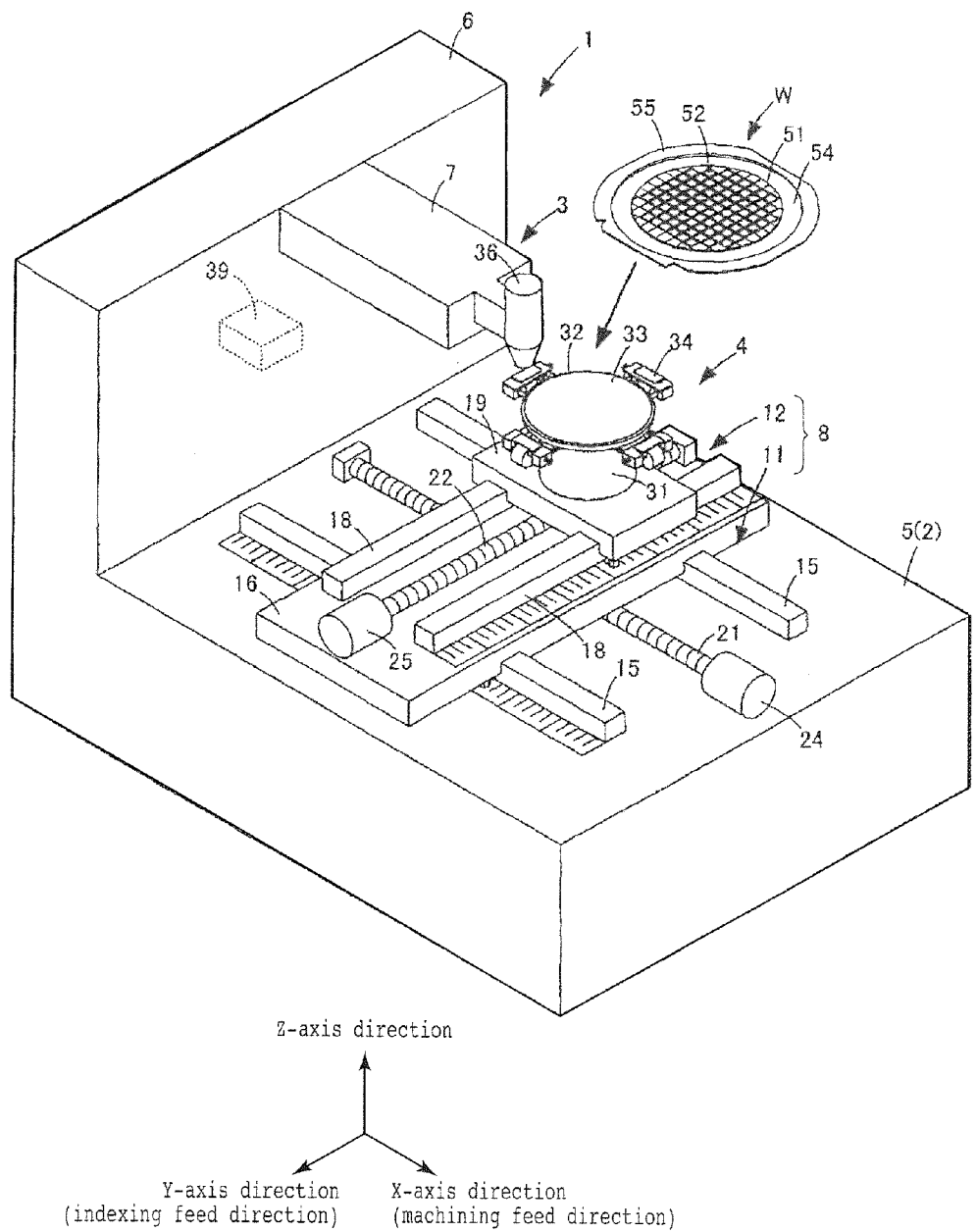
FIG. 1 is a perspective view of a laser machining apparatus which is suitable for carrying out a method of dividing a workpiece according to the present invention.

An embodiment of the present invention will be described in detail below with reference to the accompanying drawings. The arrangement of a laser machining apparatus will be described below with reference to FIGS. 1 and 2. FIG. 1 is a perspective view of a laser machining apparatus which is suitable for carrying out a method of dividing a workpiece according to an embodiment of the present invention. A dividing method as applied to divide a semiconductor wafer with a hole on a dividing line, as a workpiece, will be described below. However, the present invention is not limited to such a dividing method, but is also applicable to a method of dividing any workpiece, such as a workpiece having an irregularly shaped portion on a dividing line.

As shown in FIG. 1, a laser machining apparatus 1 includes a laser machining unit 3 for applying laser beams to a semiconductor wafer W and a holder table 4 for holding the semiconductor wafer W. The laser machining unit 3 and the holder table 4 are moved relatively to each other to machine the semiconductor wafer W. The semiconductor wafer W is in the form of a substantially circular plate and is divided into a plurality of regions by a grid-like pattern of dividing lines 51. Devices 52 such as ICs, LSI circuits, etc. are formed in the divided regions. A hole 53 as an irregularly shaped portion (see FIGS. 3A through 3C) is provided in the semiconductor wafer W on at least one of the dividing lines 51. The semiconductor wafer W is supported on an annular frame 55 by an adhesive tape 54, and is loaded into and unloaded from the laser machining apparatus 1 by the annular frame 55.

In the present embodiment, the workpiece to be divided is a semiconductor wafer W made of silicon wafer (Si), gallium arsenide (GaAs), silicon carbide (SiC), or the like. However, the workpiece to be divided is not limited to such a semiconductor wafer, but may be an adhesive member such as a DAF (Die Attach Film) disposed on the reverse side of a semiconductor wafer for mounting chips thereon, a semiconductor product package, an inorganic material substrate made of ceramics, glass, or sapphire ($Al_2O_3$), any of various electronic components such as liquid display drivers or the like, or any of various materials which need to be machined to micron-order positional precision.

The laser machining apparatus 1 has a base 2 including a head 5 in the shape of a rectangular parallelepiped and a column 6 erected from the upper surface of a rear portion of the head 5. An arm 7 projects forwardly from a front surface of the column 6. The laser machining unit 3 has a machining head (beam condenser) 36 mounted on the distal end of the arm 7. The head 5 supports on its upper surface a holder table moving mechanism 8 for moving the holder table 4 in X- and Y-axis directions.

The holder table moving mechanism 8 includes a machining feed mechanism 11 for moving the holder table 4 in the X-axis directions, which are also referred to as machining feed directions, and an indexing feed mechanism 12 for moving the holder table 4 in the Y-axis directions, which are also referred to as indexing feed directions. The machining feed mechanism 11 includes a pair of guide rails 15 mounted on the upper surface of the head 5 and extending parallel to the X-axis directions, and a motor-driven X-axis table 16 slidably supported on the guide rails 15.

The indexing feed mechanism 12 includes a pair of guide rails 18 mounted on the upper surface of the X-axis table 16 and extending parallel to the Y-axis directions, and a motor-driven Y-axis table 19 slidably supported on the guide rails 18. The holder table 4 is mounted on the upper surface of the Y-axis table 19. The X-axis table 16 and the Y-axis table 19 have respective nuts, not shown, disposed on rear surfaces thereof and threaded over respective ball screws 21, 22. The ball screws 21, 22 have respective ends connected to respective stepping motors 24, 25 mounted on the head 5 and the X-axis table 16, respectively. When the stepping motors 24, 25 are energized, the ball screws 21, 22 are rotated about their own axes, moving the X-axis table 16 and the Y-axis table 19 respectively therealong.

The holder table 4 includes a θ table 31 rotatably mounted on the upper surface of the Y-axis table 19 for rotation about a Z-axis, and a workpiece holder 32 mounted on the upper end of the θ table 31, for holding the semiconductor wafer W under suction. The workpiece holder 32 is in the form of a circular plate having a prescribed thickness and has a suction surface 33 in its upper central portion. The suction surface 33 is made of porous ceramics. The suction surface 33 serves to attract the semiconductor wafer W through the adhesive tape 54 under a negative pressure. The suction surface 33 is connected to a suction source through a tube within the θ table 31. Four clamps 34 are disposed around the workpiece holder 32 and supported by a pair of support arms which extend radially outwardly from four angularly spaced portions of the θ table 31. The four clamps 34 can be actuated by pneumatic actuators to grip respective four angularly spaced regions of the annular frame 55 around the semiconductor wafer W.

When the machining head 36, which is mounted on the distal end of the arm 7, of the laser machining unit 3 is energized, it applies laser beams from its laser beam emission port to the semiconductor wafer W on the workpiece holder 32. The laser beams that are applied from the machining head 36 include a detecting laser beam for detecting the height of the surface of the semiconductor wafer W and a machining laser beam for forming a modified layer in the semiconductor wafer W. The machining head 36, the arm 7, and the column 6 house therein an optical system (see FIG. 2) of the laser machining apparatus 1. The detecting laser beam that is emitted from the machining head 36 serves to detect the height of the surface of the semiconductor wafer W on the dividing lines 51. Based on the detected height of the surface of the semiconductor wafer W, the machining laser beam is controlled to be focused in the semiconductor wafer W for thereby forming the modified layer in the semiconductor wafer W. The modified layer serves as an area where the semiconductor wafer W will start to be divided. Specifically, the modified layer that is formed in the semiconductor wafer W by the machining laser beam has a density, a refractive index, a mechanical strength, and other physical properties different from surrounding regions, and is particularly lower in strength than the surrounding regions. The modified layer may be a melted region, a cracked region, an insulation breakdown region, a changed refractive index region, or a region made up of a mixture of some of those regions.

Figure 2:
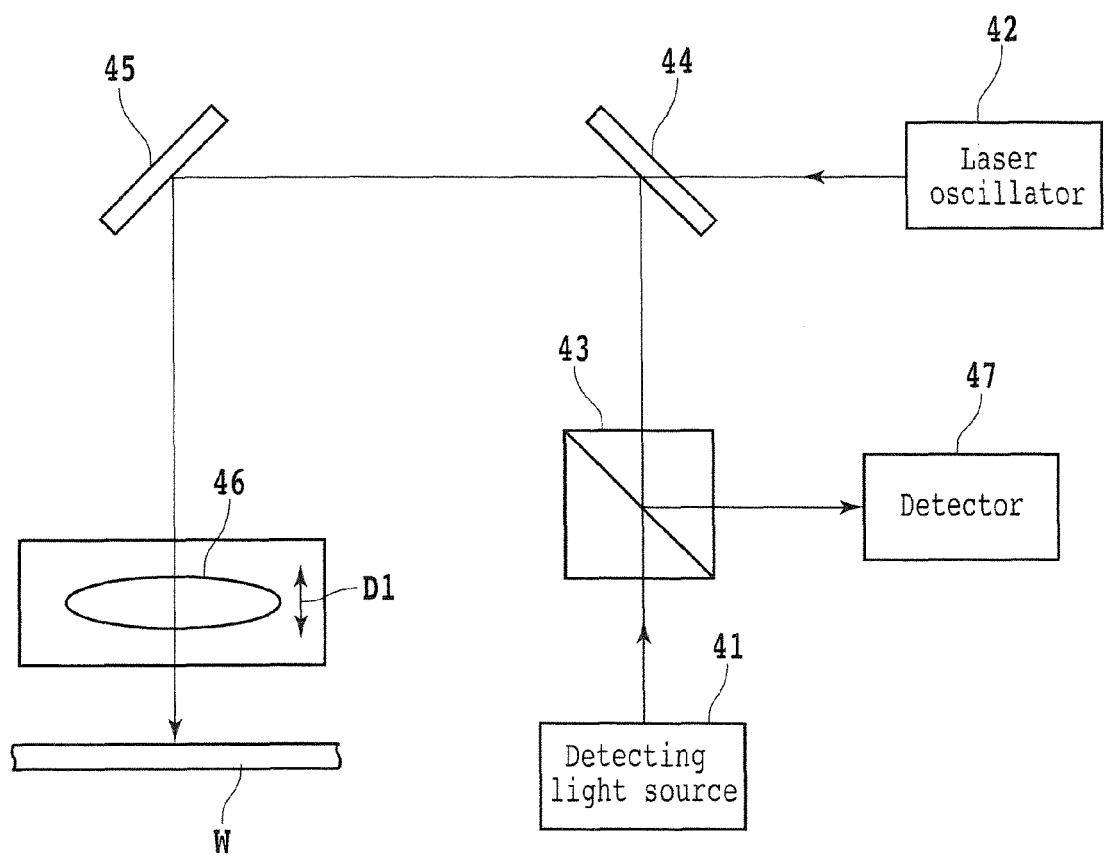
FIG. 2 is a schematic view showing an optical system of the laser machining apparatus.

The optical system of the laser machining apparatus 1 will be described below with reference to FIG. 2. FIG. 2 is a schematic view showing the optical system of the laser machining apparatus 1. As shown in FIG. 2, the optical system of the laser machining apparatus 1 includes a detecting light source 41 for detecting the height of the surface of the semiconductor wafer W and a laser oscillator 42 for emitting a laser beam having a wavelength which permeates the semiconductor wafer W. The detecting light source 41 emits a detecting laser beam having a wavelength of 633 nm, for example, to travel along an optical path which includes a beam splitter 43, a partial transmission mirror 44 for reflecting only light of a certain wavelength, such as a dichroic mirror or the like, a total reflection mirror 45, and a condenser lens 46 adjacent to the semiconductor wafer W. The laser oscillator 42, which may be a YAG laser oscillator, for example, emits a machining laser beam having a wavelength of 1064 nm to travel along an optical path which includes the partial transmission mirror 44, the total reflection mirror 45, and the condenser lens 46. Therefore, the optical path for the detecting laser beam and the optical path for the machining laser beam are held in alignment with each other between the partial transmission mirror 44 and the semiconductor wafer W, and share the partial transmission mirror 44, the total reflection mirror 45, and the condenser lens 46, so that the optical system is relatively simple in structure. The condenser lens 46 may be a single lens or a compound lens.

The partial transmission mirror 44 is arranged to pass the machining laser beam therethrough and reflect the detecting laser beam and also a laser beam reflected from the semiconductor wafer W as a result of the application of the detecting laser beam to the semiconductor wafer W. The beam splitter 43 splits the detecting laser beam emitted from the detecting light source 41 and guides a transmitted beam to the partial transmission mirror 44, and also reflects and guides a portion of the laser beam reflected by the partial transmission mirror 44 to a detector 47. The detector 47, which includes a cylindrical lens, a photodetector, etc., not shown, converts the intensity of the reflected laser beam which varies depending on the distance between the condenser lens 46 and the surface of a street on the semiconductor wafer W, into a voltage signal that represents the reflected beam intensity. The condenser lens 46 is movable along an optical axis thereof in the directions indicated by the arrow D1 for adjusting the focuses of the detecting laser beam and the machining laser beam.

The detecting laser beam that is emitted from the detecting light source 41 is split by the beam splitter 43 into a transmitted beam which is reflected by the partial transmission mirror 44 and the total reflection mirror 45 to the condenser lens 46, which focuses the detecting laser beam onto the surface of the semiconductor wafer W. The laser beam reflected from the semiconductor wafer W travels through the condenser lens 46 to the total reflection mirror 45, which reflects the reflected laser beam to the partial transmission mirror 44, which also reflects the reflected laser beam to the beam splitter 43. The beam splitter 43 splits the reflected laser beam into a reflected beam which is applied to the detector 47. The machining laser beam that is emitted from the laser oscillator 42 passes through the partial transmission mirror 44 to the total reflection mirror 45, which reflects the machining laser beam to the condenser lens 46. The condenser lens 46 focuses the machining laser beam within the semiconductor wafer W.

The laser machining apparatus 1 thus constructed performs a hole detecting process, a surface height detecting process, and a laser machining process. The hole detecting process is a process for detecting the location of a hole 53 that is formed in the semiconductor wafer W on a dividing line 51. In the hole detecting process, the detector 47 detects the location of the hole 53 by detecting an abrupt change in the intensity of the laser beam reflected from the semiconductor wafer W.

The surface height detecting process is a process for detecting the height of the surface of the semiconductor wafer W on a dividing line 51. In the surface height detecting process, the condenser lens 46 is controlled to follow the intensity of the reflected laser beam which is detected by the detector 47, except for a prescribed zone which includes the hole 53 detected by the hole detecting process. The height of the surface of the semiconductor wafer W is calculated based on the intensity of the reflected laser beam from the semiconductor wafer W and the height of the condenser lens 46. In the surface height detecting process, the condenser lens 46 is not actuated in the prescribed zone which includes the hole 53. Therefore, in the prescribed zone which includes the hole 53, the condenser lens 46 is not controlled to follow the intensity of the reflected laser beam, and hence the detected height of the surface of the semiconductor wafer W is prevented from suffering an error.

The laser machining process is a process for forming a modified layer in the semiconductor wafer W along a dividing line 51. In the laser machining process, the machining laser beam is focused in the semiconductor wafer W while the focused spot of the machining laser beam is being moved based on the height of the surface of the semiconductor wafer W which is detected according to the surface height detecting process. The hole detecting process, the surface height detecting process, and the laser machining process are controlled by a controller 39 (see FIG. 1) mounted in the column 6. The controller 39 serves to control the laser machining apparatus 1 in general. The controller 39 includes a processor for performing various processing sequences, a memory, etc. The memory includes one or more of a ROM (Read Only Memory), a RAM (Random Access Memory), etc. depending on how the memory is used. The memory stores control programs for performing the hole detecting process, the surface height detecting process, and the laser machining process.

Figure 3A:
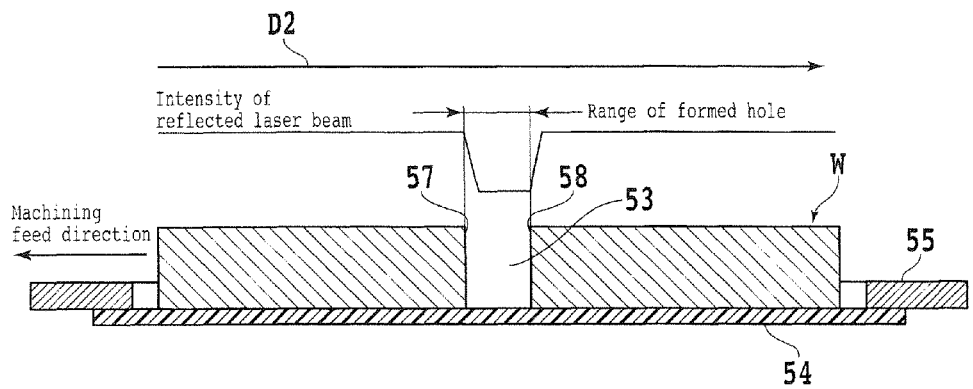
FIG. 3A is a schematic view illustrative of a hole detecting process.

The hole detecting process, the surface height detecting process, and the laser machining process which are performed on the laser machining apparatus 1 will be described in detail below with reference to FIGS. 3A through 3C. It is assumed in the description which follows that the semiconductor wafer W has a hole 53 therein, and when the detecting laser beam applied to the semiconductor wafer W scans the semiconductor wafer W in the direction indicated by the arrow D2, the detecting laser beam moves across a front edge, referred to as a leading edge 57, of the hole 53 into the hole 53, and moves across a rear edge, referred to as a trailing edge 58, of the hole 53 out of the hole 53. FIG. 3A is illustrative of the hole detecting process. In the hole detecting process, the detecting laser beam is applied to the semiconductor wafer W on the holder table 4 which is being fed in a machining feed direction, and the range in which the hole 53 is formed is detected based on the intensity of a laser beam reflected from the semiconductor wafer W as a result of the application of the detecting laser beam to the semiconductor wafer W. The intensity of the reflected laser beam sharply drops when the applied position of the detecting laser beam moves across the leading edge 57, and sharply rises when the applied position of the detecting laser beam moves across the trailing edge 58. Therefore, the hole 53 is estimated to be present in a range from the position where the intensity of the reflected laser beam starts to sharply drop to the position where the intensity of the reflected laser beam starts to sharply rise. Sharp changes in the intensity of the reflected laser beam may be determined in any way. For example, sharp changes in the intensity of the reflected laser beam may be determined by being compared with a preset threshold value. In the hole detecting process, the height of the condenser lens 46 may be fixed at a certain height or may be controlled to follow the intensity of the reflected laser beam. After the range in which the hole 53 is formed is detected according to the hold detecting process, the surface height detecting process is carried out.

Figure 3B:
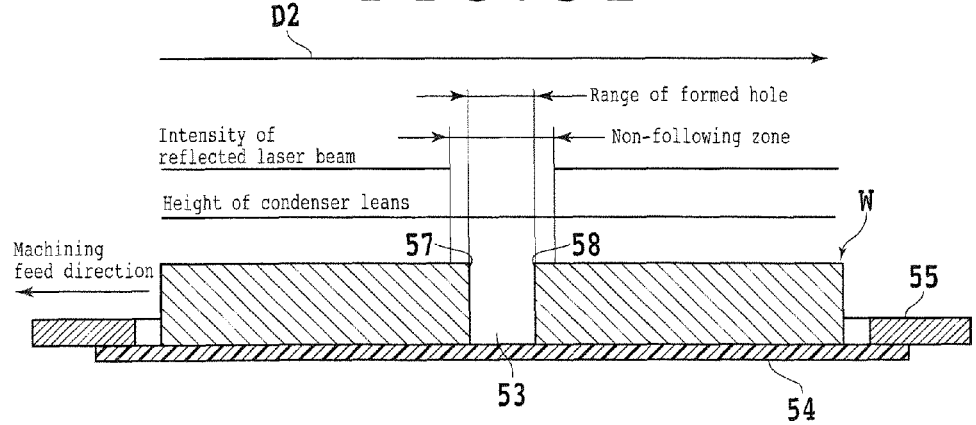
FIG. 3B is a schematic view illustrative of a surface height detecting process.

FIG. 3B is illustrative of the surface height detecting process. In the surface height detecting process, the detecting laser beam is applied to the semiconductor wafer W on the holder table 4 which is being fed in a machining feed direction, and the height of the surface of the semiconductor wafer W while the condenser lens 46 is being controlled to follow the intensity of the laser beam reflected from the semiconductor wafer W. In the surface height detecting process, a non-following zone for the condenser lens 46 is established so as to include the range or zone in which the hole 53 is formed that is detected according to the hole detecting process. The non-following zone is a zone wherein the condenser lens 46 is not controlled to follow the intensity of the reflected laser beam. The non-following zone is determined by adding a prescribed additional zone to front and rear ends of the range in which the hole 53 is formed. The additional zone may be established depending on the accuracy with which to detect the range in which the hole 53 is formed.

The height of the condenser lens 46 is controlled to follow the intensity of the reflected laser beam until the applied position of the detecting laser beam enters the non-following zone. When the applied position of the detecting laser beam enters the non-following zone, the detecting light source 41 stops emitting the detecting laser beam and the condenser lens 46 stops being controlled to follow the intensity of the reflected laser beam. When applied position of the detecting laser beam leaves the non-following zone, the detecting light source 41 resumes emitting the detecting laser beam and the condenser lens 46 starts being controlled to follow the intensity of the reflected laser beam. Consequently, outside the non-following zone, the height of the surface of the semiconductor wafer W is detected based on the intensity of the reflected laser beam and the height of the condenser lens 46 which is controlled to follow the intensity of the reflected laser beam. In a range from the starting position of the non-following zone to the leading edge 57 of the hole 53 and also in a range from the trailing edge 58 of the hole 53 to the ending position of the non-following zone, a height of the surface of the semiconductor wafer W immediately before the applied position of the detecting laser beam enters the non-following zone is used as the height of the surface of the semiconductor wafer W. Alternatively, an empirically determined height may be used instead of the height of the surface of the semiconductor wafer W immediately before the applied position of the detecting laser beam enters the non-following zone.

In the present embodiment, as described above, the non-following zone is determined by adding a prescribed additional zone to the front and rear ends of the range in which the hole 53 is formed. However, the configuration is not limited to this. Since an error tends to occur at the trailing edge 58 in detecting the height of the surface of the semiconductor wafer W, an additional zone may be added only to the rear end of the range in which the hole 53 is formed. After the height of the surface of the semiconductor wafer W is detected according to the surface height detecting process, the laser machining process is carried out.

Figure 3C:
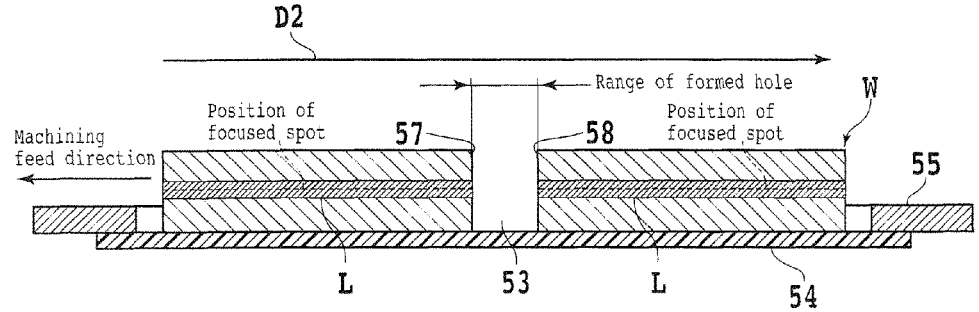
FIG. 3C is a schematic view illustrative of a laser machining process.

FIG. 3C is illustrative of the laser machining process. In the laser machining process, the machining laser beam is applied to the semiconductor wafer W on the holder table 4 which is being fed in a machining feed direction, for thereby forming a modified layer L within the semiconductor wafer W. The machining laser beam is focused in the semiconductor wafer W while the focused spot of the machining laser beam is being moved based on the height of the surface of the semiconductor wafer W which is detected according to the surface height detecting process. The modified layer L is continuously formed at depths from the surface of the semiconductor wafer W which are commensurate with surface displacements of the semiconductor wafer W. Thereafter, when the semiconductor wafer W is subjected to external forces, the semiconductor wafer W is divided from the modified layer L into individual chips. The semiconductor wafer W may be divided in any ways. For example, an adhesive tape 54 applied to the reverse side of the semiconductor wafer W may be stretched by a tape stretching device 55 to break the semiconductor wafer W into individual chips.

An overall sequence of dividing the semiconductor wafer W will briefly be described below. First, the semiconductor wafer W is placed on the holder table 4. Then, the holder table 4 is moved to a machining position facing the machining head 36. The laser beam emission port of the machining head 36 is aligned with a dividing line 51 on the semiconductor wafer W, and the condenser lens 46 is actuated to focus the detecting laser beam onto the surface of the semiconductor wafer W. Then, the hole detecting process (irregularly shaped portion detecting step) is started. In the hole detecting process, the machining head 36 applies the detecting laser beam to the dividing line 51 on the semiconductor wafer W, and the detector 47 detects the intensity of the laser beam reflected from the semiconductor wafer W. The location of a hole 53 in the semiconductor wafer W is detected based on an abrupt change in the intensity of the reflected laser beam.

At this time, the holder table 4 which is holding the semiconductor wafer W thereon is fed in an X-axis direction, and the location of a hole 53 in the semiconductor wafer W on the dividing line 51 is detected. Then, the holder table 4 is moved in a Y-axis direction by the pitch of dividing lines 51 to bring the laser beam emission port of the machining head 36 into alignment with an adjacent dividing line 51. Then, the holder table 4 which is holding the semiconductor wafer W thereon is fed in the X-axis direction, and the location of a hole 53 in the semiconductor wafer W on the adjacent dividing line 51 is detected. The above process is repeated until the locations of holes 53 on all dividing lines 51 which extend in a first direction on the semiconductor wafer W are detected. Thereafter, the θ table 31 is turned 90 degrees about its own axis, and the above process is repeated until the locations of holes 53 on all dividing lines 51 which extend in a second direction, that is perpendicular to the first direction, on the semiconductor wafer W are detected.

After the hole detecting process is completed, the surface height detecting process (surface height detecting step) is carried out. In the surface height detecting process, the intensity of a laser beam reflected from the semiconductor wafer W at the time the machining head 36 applies the detecting laser beam to the semiconductor wafer W on a dividing line 51 is detected, and the height of the condenser lens 46 is controlled to follow the detected intensity of the reflected laser beam. The height of the surface of the semiconductor wafer W is detected based on the detected intensity of the reflected laser beam and the height of the condenser lens 46 at this time. In the surface height detecting process, a non-following zone for the condenser lens 46 is established so as to include the range in which the hole 53 is formed that is detected according to the hole detecting process. The non-following zone is a zone wherein the intensity of the reflected laser beam stops being detected and the condenser lens 46 stops being controlled to follow the intensity of the reflected laser beam. As with the hole detecting process, the holder table 4 is moved and the heights of the surfaces of the semiconductor wafer W on all the dividing lines 51, except for the holes 53, are detected.

After the surface height detecting process is completed, the laser machining process (modified layer forming step) is carried out. In the laser machining process, a modified layer is formed in the semiconductor wafer W by focusing the machining laser beam in the semiconductor wafer W and moving the focused spot of the machining laser beam based on the height of the surface of the semiconductor wafer W which is detected according to the surface height detecting process. As with the hole detecting process, the holder table 4 is moved and modified layers are continuously formed in the semiconductor wafer W along all the dividing lines 51, except for the holes 53. After the laser machining process is completed, the semiconductor wafer W is detached from the holder table 4 and loaded into a wafer dividing device, not shown. In the wafer dividing device, external forces are applied to the modified layers formed in the semiconductor wafer W along the dividing lines 51, thereby dividing the semiconductor wafer W into individual chips (dividing step).

With the dividing method according to the present embodiment, as described above, the heights of the surfaces of the semiconductor wafer W on the dividing lines 51 except for the locations of the holes 53 are detected, and the focused spot of the machining laser beam is adjusted based on the detected heights of the surfaces. Therefore, the adjustment of the focused spot of the machining laser beam is not adversely affected by extreme height differences at the holes 53. As a result, modified layers can be formed along the dividing line 51 at appropriate depths in the semiconductor wafer W with the holes 53 formed therein. When the semiconductor wafer W is then divided along the dividing lines 51, individual chips of high quality can be produced from the semiconductor wafer W. The semiconductor wafer W as a workpiece has been described above as having holes as irregularly shaped portions. However, irregularly shaped portions may be other than holes. Irregularly shaped portions may be any portions having height differences in excess of the range in which the condenser lens is movable. For example, irregularly shaped portions may be recesses in the surface of the workpiece or bumps on the surface of the workpiece. Even if irregularly shaped portions have height differences not in excess of the range in which the condenser lens is movable, they may be regarded as such provided they cause an error in the surface height detecting process in view of the rate at which the condenser lens responds when it moves, the acceleration or deceleration of the condenser lens, the rate at which the workpiece is fed, etc.

In the above embodiment, the detecting laser beam is applied to the workpiece along the dividing lines to detect the locations of irregularly shaped portions. However, the locations of irregularly shaped portions of the workpiece may be detected in any ways. For example, the locations of irregularly shaped portions of the workpiece may be obtained from the information about the workpiece which is created at the time the workpiece is fabricated. In the above embodiment, the non-following zone for the condenser lens 46 is established so as to include the range in which an irregularly shaped portion is formed. However, the non-following zone for the condenser lens 46 may be in exact agreement with the range in which an irregularly shaped portion is formed, if the detected height of the surface is free of an error due to an abrupt change in the intensity of the reflected laser beam.

The present invention is highly advantageous in that it is capable of forming, with a laser beam, a modified layer at an appropriate depth in a workpiece including an irregularly shaped portion which has an extreme height difference, and is particularly useful when applied to a method of dividing a workpiece such as a semiconductor wafer or a light-emitting device wafer with a laser beam.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method of dividing a workpiece along a dividing line, the workpiece including an irregularly shaped portion at a location on the dividing line, comprising:

an irregularly shaped portion detecting step of detecting the location of said irregularly shaped portion, wherein the location includes a leading edge and a trailing edge;

after performing said irregularly shaped portion detecting step, performing a surface height detecting step of applying a detecting laser beam to an area of the workpiece, except for the location which was detected in said irregularly shaped portion detecting step, along the dividing line to detect a height of a surface of the workpiece except for said location, whereby the detecting laser beam is stopped in a vicinity of the leading edge of said location and the detecting laser beam is re-started in a vicinity of the trailing edge of said location of the irregularly shaped portion;

a modified layer forming step of applying and focusing a machining laser beam having a wavelength which permeates the workpiece within the workpiece while moving a focused spot of the machining laser beam based on the height of the surface of the workpiece which is detected in said surface height detecting step to form a modified layer in an area of the workpiece except for at least said location of said irregularly shaped portion along the dividing line; and a dividing step of applying an external force to said modified layer to divide the workpiece along the dividing line.

2. The method according to claim 1, wherein said irregularly shaped portion detecting step comprises the steps of applying the detecting laser beam along the dividing line including said location of the irregularly shaped portion, and detecting the location of the irregularly shaped portion based on the intensity of a laser beam which is reflected from said workpiece at the time said detecting laser beam is applied to the workpiece.

3. The method according to claim 2, wherein during said irregularly shaped portion detecting step, said location of the irregularly shaped portion is determined by comparing the intensity of the reflected laser beam with a preset threshold value.

4. The method according to claim 1, wherein:

the vicinity of the leading edge includes an additional front zone added to the location of the leading edge detected during said irregularly shaped portion detecting step; and the vicinity of the trailing edge includes an additional rear zone added to the location of the trailing edge detected during said irregularly shaped portion detecting step.

5. The method according to claim 1, wherein:

the vicinity of the leading edge is the location of the leading edge detected during said irregularly shaped portion detecting step; and the vicinity of the trailing edge includes an additional rear zone added to the location of the trailing edge detected during said irregularly shaped portion detecting step.

* * * * *